(12) United States Patent
Mccown et al.

(10) Patent No.: US 10,943,063 B1
(45) Date of Patent: Mar. 9, 2021

(54) APPARATUS AND METHOD TO AUTOMATE WEBSITE USER INTERFACE NAVIGATION

(71) Applicant: Anonyome Labs, Inc., Draper, UT (US)

(72) Inventors: Steven Harvey Mccown, Mapleton, UT (US); Paul Ashley, Toowong (AU); Steve Shillingford, Draper, UT (US); Greg Clark, San Francisco, CA (US)

(73) Assignee: ANONYOME LABS, INC., Draper, UT (US)

( * ) Notice: Subject to any disclaimer, the term of this patent is extended or adjusted under 35 U.S.C. 154(b) by 198 days.

(21) Appl. No.: 15/874,788

(22) Filed: Jan. 18, 2018

Related U.S. Application Data

(60) Provisional application No. 62/562,944, filed on Sep. 25, 2017.

(51) Int. Cl.
| | | |
|---|---|---|
| *G06F 40/174* | (2020.01) | |
| *G06F 21/56* | (2013.01) | |
| *G06F 16/955* | (2019.01) | |
| *H04L 29/06* | (2006.01) | |

(52) U.S. Cl.
CPC ........ *G06F 40/174* (2020.01); *G06F 16/9566* (2019.01); *G06F 21/566* (2013.01); *H04L 63/0407* (2013.01)

(58) Field of Classification Search
CPC .. G06F 17/243; G06F 16/9566; G06F 21/566; H04L 63/0407
See application file for complete search history.

(56) References Cited

U.S. PATENT DOCUMENTS

| | | | | |
|---|---|---|---|---|
| 6,363,376 B1* | 3/2002 | Wiens | ............... | G06Q 10/10 |
| 6,651,217 B1* | 11/2003 | Kennedy | ............... | G06F 17/243 |
| | | | | 715/224 |
| 7,254,569 B2* | 8/2007 | Goodman | ............ | G06F 17/243 |
| 8,386,333 B2* | 2/2013 | Sonderegger | .......... | G06Q 30/06 |
| | | | | 705/26.1 |
| 9,372,987 B1 | 6/2016 | Ashley et al. | | |
| 9,374,689 B1 | 6/2016 | Ashley et al. | | |
| 9,703,986 B1 | 7/2017 | Ashley et al. | | |
| 9,703,988 B1* | 7/2017 | Sudbury | ................. | G06F 21/64 |
| 9,729,519 B1 | 8/2017 | Ashley et al. | | |
| 10,178,106 B1 | 1/2019 | Ashley et al. | | |
| 10,320,753 B1 | 6/2019 | Ashley et al. | | |
| 2001/0016828 A1* | 8/2001 | Philippe | ................. | G06F 17/22 |
| | | | | 705/26.8 |
| 2002/0093530 A1* | 7/2002 | Krothapalli | ........... | G06F 17/243 |
| | | | | 715/745 |
| 2003/0028792 A1* | 2/2003 | Plow | .................... | G06F 17/243 |
| | | | | 713/193 |
| 2003/0126094 A1* | 7/2003 | Fisher | ................... | G06Q 20/02 |
| | | | | 705/75 |

(Continued)

*Primary Examiner* — Michael Pyzocha
(74) *Attorney, Agent, or Firm* — Cooley LLP

(57) ABSTRACT

An apparatus has a processor and a memory connected to the processor. The memory stores instructions executed by the processor to store identity attributes including real identity attributes for a real individual and a digital identity with digital identity data attributes operative as a personal privacy proxy for the real individual. Web site input forms are automatically filled alternately using the real identity attributes and the digital identity attributes.

14 Claims, 12 Drawing Sheets

(56) References Cited

U.S. PATENT DOCUMENTS

| | | | |
|---|---|---|---|
| 2004/0059809 A1* | 3/2004 | Benedikt | G06F 16/951 709/224 |
| 2005/0044423 A1* | 2/2005 | Mellmer | G06F 21/31 726/4 |
| 2005/0216356 A1* | 9/2005 | Pearce | G06F 40/174 715/207 |
| 2006/0026438 A1* | 2/2006 | Stern | H04L 51/12 713/184 |
| 2007/0299920 A1* | 12/2007 | Crespo | G06Q 30/0603 709/206 |
| 2008/0133716 A1* | 6/2008 | Rao | G06Q 30/08 709/220 |
| 2008/0235567 A1* | 9/2008 | Raj | G06F 40/174 715/226 |
| 2009/0070434 A1* | 3/2009 | Himmelstein | H04L 51/38 709/217 |
| 2009/0217351 A1* | 8/2009 | Burch | H04L 63/0281 726/3 |
| 2011/0046969 A1* | 2/2011 | Carlson | G06Q 20/10 705/1.1 |
| 2013/0081120 A1* | 3/2013 | DeLuca | G06F 16/957 726/7 |
| 2013/0104022 A1* | 4/2013 | Coon | G06F 40/174 715/226 |
| 2014/0157390 A1* | 6/2014 | Lurey | G06F 21/123 726/7 |
| 2014/0304097 A1* | 10/2014 | Milian | G06Q 30/0601 705/26.1 |
| 2015/0269369 A1* | 9/2015 | Hamid | G06F 9/4401 726/5 |
| 2015/0363862 A1* | 12/2015 | Ranft | G06Q 30/0631 705/26.7 |
| 2016/0065541 A1* | 3/2016 | Winner | H04L 63/0421 726/6 |
| 2016/0162460 A1* | 6/2016 | Nash | G06F 17/243 715/226 |
| 2016/0300231 A1* | 10/2016 | Shavell | G06Q 20/4016 |
| 2017/0142158 A1* | 5/2017 | Laoutaris | H04L 67/306 |
| 2017/0357627 A1* | 12/2017 | Peterson | G06F 40/174 |
| 2018/0227301 A1* | 8/2018 | Maruyama | H04L 63/08 |

* cited by examiner

600

602

| URL: | |
|---|---|
| Username: | name@example.com |
| Password: | ********** |

Login  Cancel

604

| First Name: | John |
|---|---|
| Last Name: | Doe |
| Phone: | (123) 456 - 7890 |
| New Password: | ********** |

Sign Up  Cancel

APPARATUS AND METHOD TO AUTOMATE WEBSITE USER INTERFACE NAVIGATION

CROSS REFERENCE TO RELATED APPLICATIONS

This application claims priority to U.S. Provisional Patent Application Ser. No. 62/562,944, filed Sep. 25, 2017, the contents of which are incorporated herein by reference.

FIELD OF THE INVENTION

This invention relates generally to communications in computer networks. More particularly, this invention is directed toward techniques to automate website user interface navigation.

BACKGROUND OF THE INVENTION

The invention is disclosed in the context of the following definitions. Identity is the characteristics determining who or what a person or thing is. Legal Identity is a set of identifying attributes, as designated by a $3^{rd}$ Party, which are used for verification, validation, and authentication.

Digital Legal Identity is a digital equivalent of a Legal Identity. Digital Identity is a role-based digital identity that is created, controlled, and managed by an individual and is used for verification, validation, and authentication.

The World Wide Web (web) is a globally-distributed information space in which content producers provide web pages of information content to web users through Uniform Resource Locators (URLs). In addition to pages of static information, content providers regularly provide dynamic information content, as well as, interactive experiences though which web users provide data and information to websites that process the information and return results to the web users. This bi-directional information exchange has become the mainstay of the web.

At times, the web user would like to provide data to a remote website (in exchange for returned results) without having to manually perform all of the requisite typing or speech input, which are the normal methods of user data input. Wherever possible, it would be more convenient for users to simply authorize the upload of requested data rather than having to manually input it. In other words, it would be desirable to provide processes and methods that enable automated mechanisms to download website information requests, identify the components in those requests, match those requests to known data elements, and then upload the requested data content.

SUMMARY OF THE INVENTION

An apparatus has a processor and a memory connected to the processor. The memory stores instructions executed by the processor to store identity attributes including real identity attributes for a real individual and a digital identity with digital identity data attributes operative as a personal privacy proxy for the real individual. Website input forms are automatically filled alternately using the real identity attributes and the digital identity attributes.

BRIEF DESCRIPTION OF THE FIGURES

The invention is more fully appreciated in connection with the following detailed description taken in conjunction with the accompanying drawings, in which:

FIG. 6 illustrates a two input form on a single web page that is processed in accordance with an embodiment of the invention.

Like reference numerals refer to corresponding parts throughout the several views of the drawings.

DETAILED DESCRIPTION OF THE INVENTION

Figure 1:
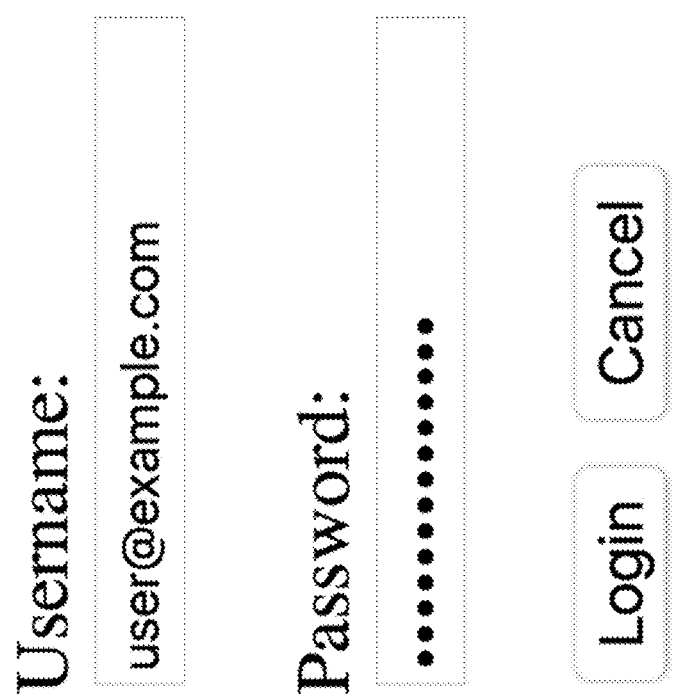
FIG. 1 illustrates a login page rendered from HTML.

While the methods described below use account creation and login processes as examples, it should be noted that these processes may be applied to any web-based information exchange process. Purposes of the invention are to provide methods of:

1. Mapping a website's user input form structures (or user-selected portions thereof) in a priori and/or dynamic fashions
2. Enable users to save data they enter into webpage forms or other input venues
3. Correlate the website mappings with user data
4. Store the correlated mappings and user data in a user-controlled database (local or remote)
5. Dynamically correlate user data with newly-discovered website input form structures
6. Auto-fill website input forms
7. Automate the website input form sequences by both auto-filling stored and correlated user data, as well as, automatically invoking action sequences (e.g., automatically pressing a 'Submit' button) on a live website In the disclosed technology, Internet users each have a legal identity, designated by a $3^{rd}$ Party, which is used for verification, validation, and authentication. Internet users also have one or more digital identities that they develop in order to compartmentalize the various Internet usage roles that they create. These Internet usage roles are used to separate activities, such as: medical research, online banking, shopping, social networking, etc. Separating these roles and activities is important in order to block websites and other $3^{rd}$ parties from tracking a user's full activity set without consent. For further details, see commonly owned U.S. patent application Ser. No. 15/714,933 entitled "Apparatus and Method for Building, Extending, and Managing Interactions Between Digital Identities and Digital Identity Applications", filed on Sep. 25, 2017. The content of that application is incorporated herein by reference.

The disclosed technology provides the ability for digital identity users and automated services to accelerate interactions with arbitrary websites by automating the navigation of forms sequences and input of requested information and data on a digital identity-by-digital identity basis. A parsing service is given a starting URL and analyzes the web page content. The parsed content is checked for input fields, which are stored for later access. Subsequently, the input fields are compared with known data sets to create a mapping between requested data and data that is known by the system. At a later time, a user or automated service may instruct the system to navigate back to the site and automatically input select user data into the website's form input fields and automatically activate navigation buttons (e.g., 'Submit' button) to transmit data and perform associated actions.

Web pages may be presented using a variety of technologies that are interpretable by web browsers that render (display) informational content for users. Some of the main technologies used today include: Hypertext Markup Language (HTML), Javascript, PHP, etc. Although the methods presented in this disclosure could be implemented using a variety of technologies, most of the examples will be presented using HTML. Below is one example of how a very simple login form can be written using HTML.

1. <form action="/login.php">
2. Username:<br>
3. <input type="text" name="username"><br><br>
4.
5. Password:<br>
6. <input type="password" name="password"><br><br>
7.
8. <input type="submit" value="Login">
9. <input type="submit" value="Cancel">
10. </form>

The HTML code demonstrates how the individual form fields are created using HTML tags and together comprise a simple login form. Throughout this description, these types of elements will be referred to as webpage elements to identify them regardless of the implementing technology, unless specifically referring to HTML. The term webpage element name refers to the programmer-given name (if provided) that is assigned to a particular webpage element. Line 1 above shows how a form is started and line 10 shows how it is ended. All of the code between lines 1 and 10 comprises the specified form. On lines 3, 6, 8, and 9, various types of form input fields are specified.

The input tag on line 3 denotes an input field for entering normal text data. The 'name' component of line 3 denotes that when the form is submitted for processing that it will take the data that the user enters into this field and store it under the name "username".

The input tag on line 6 denotes that an input field for entering passwords will be created. Since the type is "password" and not "text", when the user types characters, the HTML specification stipulates that the on-screen presentation will represent each character as a dot (e.g., '•'). Using dots as the user types characters blocks people from looking at the user's screen to read their password.

On line 8, the input tag denotes a "submit" action, which is represented as a clickable onscreen button. In this instance, the input tag/button displays the word "Login".

Together, the elements of this form enable a web browser to collect a username and password from the user and, upon the user clicking the "Login" button, pass that information to a login script, which is designated by the form's opening tag on line 1.

Contemporary web page creation standards (e.g., HTML) provide a deterministic means of identifying input fields and action fields (e.g., submit types). This allows web browsers to interpret the web page creation code and render the appropriate on-screen user interface components and functionality. Similarly, it also enables other software, as presented herein, to interpret the specified form data, programmatically. FIG. 1 shows how the HTML login page from the code above could be rendered in a web browser.

An individual has a legal identity, which is comprised of credentials designated by $3^{rd}$ parties. Such legal identity credentials can include things, such as: a national identification number (e.g., Social Security Account Number in the United States), a driver's license, a national passport, etc.

As individuals operate online, the websites they visit collect personal bits of information that are gathered, correlated, and shared among other websites. Large marketing services operate on the sharing of consumer information. While having targeted advertising deliver relevant advertisements to the user is not necessarily a bad thing, these large repositories of personalized consumer information are also available to nefarious characters, such as identity thieves, account hackers, or other scammers. Much of this personal information gathering is happening in ways that are difficult for individual consumers to fight.

Using digital identities, internet users are able to approach the internet at different times and for different reasons using a clean slate approach, so that their current activities will not be relatable to previous activities. This has the effect of causing the online personal identity trackers to view a user's previous activity as separate from their subsequent activities—when separate digital identity roles are employed. As an example, suppose that an internet user employed one digital identity role to search for personal medical topics and then employed a separate digital identity role for online shopping. While information is still collected about the internet user's online activities, using separate digital identities precludes the online personal identity trackers from correlating an individual's medical searches with their general online shopping. This separation dramatically improves a person's online privacy.

For the purposes of this invention, the term user is used throughout this disclosure and is deemed to represent either of legal identity and digital identity throughout the text and in practice the selection of either would be made at the discretion of the individual internet user.

Users operating online employ digital identities (as described previously) for a wide variety of reasons including: to compartmentalize their activities, protect their identity, etc. For a given digital identity, a user may also want to subscribe to emailing lists, open a payment account, book a hotel stay, etc. As is described below, this invention augments the digital identity capabilities by enabling them to automate web-based input forms, which can be used for many purposes, which include online account creation and online account logins.

Many account-based websites allow users to setup new accounts with only an email address and a user-supplied password. Other websites are more discerning regarding which potential customers they want to allow to connect to their systems. Discerning 'good' customers or users is a difficult thing for a site to determine until they allow the user to operate within their site for a period of time. Over time, many sites build an internal reputation score based on things, such as: number of purchases, number of positive reviews, comments rated as positive by other users, etc. Whatever the criteria for reputations, many monitor the positive interactions of their customers.

To further enable websites to ascertain the reputation of new and returning users, an embodiment of the invention presents a method of building, maintaining, and sharing a reputation score that can be referenced, not just within an individual site, but also between sites. To convey a reputation score to a remote website, the website implements an API to enable detection and interpretation of the reputation score sent by the user's browser or application. The actual methods for creating and using inter-site reputation scores builds upon the methods disclosed in commonly owned U.S. Pat. No. 9,703,986, which is entitled "Decentralized Reputation Service for Synthetic Identities", which is incorporated herein by reference.

Building upon the methods provided in U.S. Pat. No. 9,703,986, this invention introduces the ability for a digital identity's reputation score to be sent as part of the on-ramp processes (e.g., sign-up, login, etc.) described below. In one embodiment, the reputation score (or a web-based reference to it) could be added as part of the on-ramp automation and transmitted along with the form-based automation transmission. This would require web servers to add new functionality to receive the new data. In another embodiment, the on-ramp transmissions will frequently be transmitting the digital identity's username (alternatively: email address, phone number, etc.) as part of the on-ramp processes. In this embodiment, a website receiving an on-ramp automation transmission could use the digital identity's username and verify its reputation score using the methods taught in U.S. Pat. No. 9,703,986. This method enables a website to determine the external (e.g., internet-wide) reputation of a customer or potential customer prior to conducting transactions with the customer. Based upon the reputation score, a website could enroll a new customer, enroll a new customer and immediately upgrade them to a higher status, enroll a new customer conditionally, or even block the customer altogether. Enabling websites to receive externally created digital identities with corresponding reputation scores allows a website to inherit the trust and reputation characteristics achieved by the digital identity's performance on other websites.

Applications that automatically fill-in (or copy) data into a webpage's data entry fields include web browsers and password managers. These types of applications record the websites where users have entered form data, as well as, the data itself. By storing the websites and user data, these applications can pre-populate the form fields when a user re-visits a webpage containing a form, thus saving the user from re-typing commonly-entered information. For the purposes of this disclosure, the collection of data that a user can input or upload to a website consists of the full range of digital information (including metadata), such as: text, dates, numbers, phone numbers, images, contact information, audio, video, location information, binary data, or other data that users can upload or that they can allow to be uploaded, etc. This expanded collection of data is referred to as user data.

In one embodiment of this invention, as users visit websites that present user input forms, they initially enter their data into the requested input fields (i.e., webpage elements) either manually, by copying and pasting data, or by some other user-directed process. As the user inputs this data, it is recorded into a protected (e.g., encrypted) digital identity database of user data, which is referred to as a user data management system (UDMS). Saving the data into a database allows it to be retrieved for later use by the user or an automated service that is authorized by the user. Standard database actions and managerial data are also employed with the user data management system and can include options to add, delete, modify, sort, search, etc.

In addition to storing the user data elements entered by a user, the user data management system also records the Webpage URL, Web Element Name of the field in which the data was entered along with the data's type (e.g., string, integer, etc.) and stores those correlated elements in the database. The general representation of this information is shown below.

| Webpage URL | User Data Element | Webpage Element Names (Aliases) | Data Type |
|---|---|---|---|
| The URL of the webpage hosting the input form containing the associated webpage elements | -Personal data entered by the user<br>-A single piece of data | -A variable programming name or label as created by the webpage programmer<br>-Multiple webpage element names could refer to a single user data element | -The underlying data type, which could be any accepted type, such as: integer,, text binary, etc.<br>-A single type refers to the user data element |

Often, different webpages programmers will give different webpage element names to page fields of a similar purpose. For example, one programmer may name an input field intended to collect a user's login name as "username", while another may label a similarly-purposed field on a different webpage as "uname". Despite the differences in programmer-chosen naming conventions, the fields' purposes remain the same and the same piece of user data could be used in either field. To accommodate multiple webpage element names being used to refer to the same piece of user data, each user data entry in the user data management system entries may have multiple corresponding webpage element names. This multiplicity of corresponding webpage element names may also be referred to as aliases. A sample set of user data management system entries corresponding to a simple login form is provided below.

| Webpage URL | User Data | Webpage Element Names (Aliases) | Data Type |
|---|---|---|---|
| https://www.example.com/page1.html | name@example.com | -email<br>-email_address<br>-e_mail<br>-user_email | String |
| https://www.example.com/page1.html | User1 | -username<br>-user<br>-uname<br>-loginID | String |
| https://www.example.com/page1.html | $secretP@sswOrd | -password<br>-pass<br>-user_pass<br>-Pass1 | String |
| https://www.example.com/page1.html | <Button Press> | -Login<br>-Sign-In<br>-Submit | Action |

In order to auto-fill the user data into a webpage's data entry fields, each field's webpage element name is queried in the user data management system in order to check for a corresponding user data element. (In addition to simple queries, security checks can be employed that require webpage element names to be referenced only by the original webpage URL, require users to confirm access, or enable a user-authorized free-flow of user data when accessing user data from different websites.) Successfully retrieving the referenced user data allows the calling application to automatically copy it into the webpage's corresponding webpage elements (i.e., data entry fields).

Sometimes, it will be discovered that a given webpage element may correspond to more than one user data element. For example, a user may have two or more email addresses that they use at different times. This can also occur when a single internet user employs multiple digital identities across their several usage roles. The case of a user employing multiple digital identity roles can be handled by the user selecting which digital identity is used prior to visiting a target webpage or prior to completing and submitting a page's form.

In the case where a single user (or digital identity) has multiple user data types corresponding to a given webpage element, the calling application can choose how to handle multiple user data types. In one embodiment, a custom icon may be displayed in or near a particular form field indicating to the user that multiple user data elements exist. In this case, the user could click the icon, view a selection-type box of available options, and select one of the options presented. In another embodiment, the most frequently used user data element corresponding to the webpage element could be auto-filled by default. In another embodiment, the least recently used user data element could be auto-filled or otherwise returned to the calling process. If no user data element matches a given webpage element, then the field is not auto-filled and is left blank.

Figure 2:
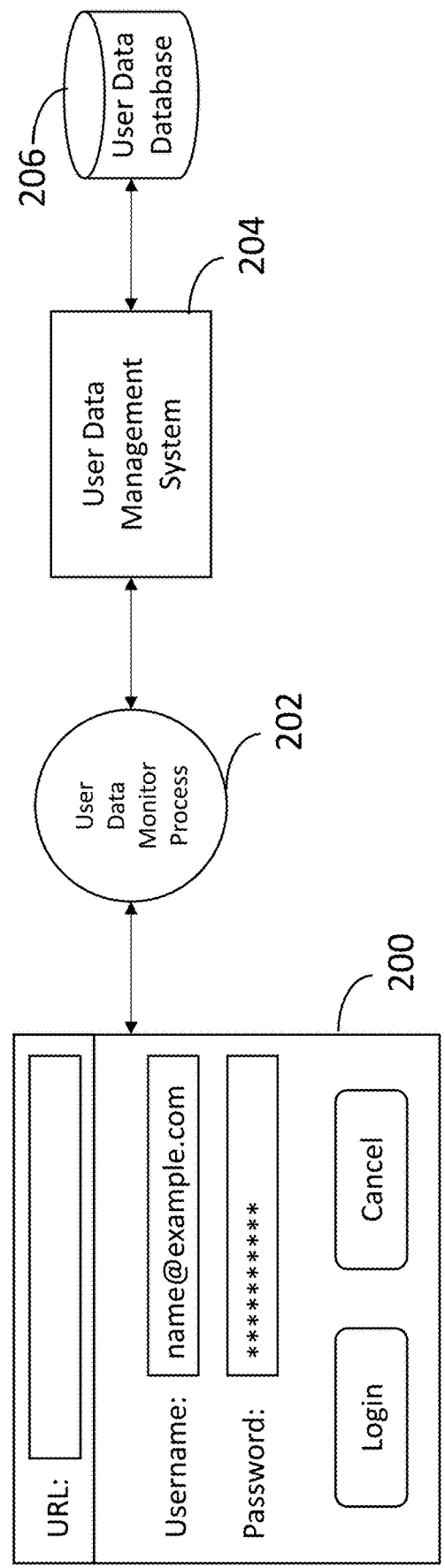
FIG. 2 illustrates web page population via a user data management system.

FIG. 2 shows a diagram of how these interactions may be performed. In particular, the figure illustrates a web form 200 that is processed by a user data monitor 202, which generates data for the user data management system 204, which may interact with a user data database 206.

Figure 3:
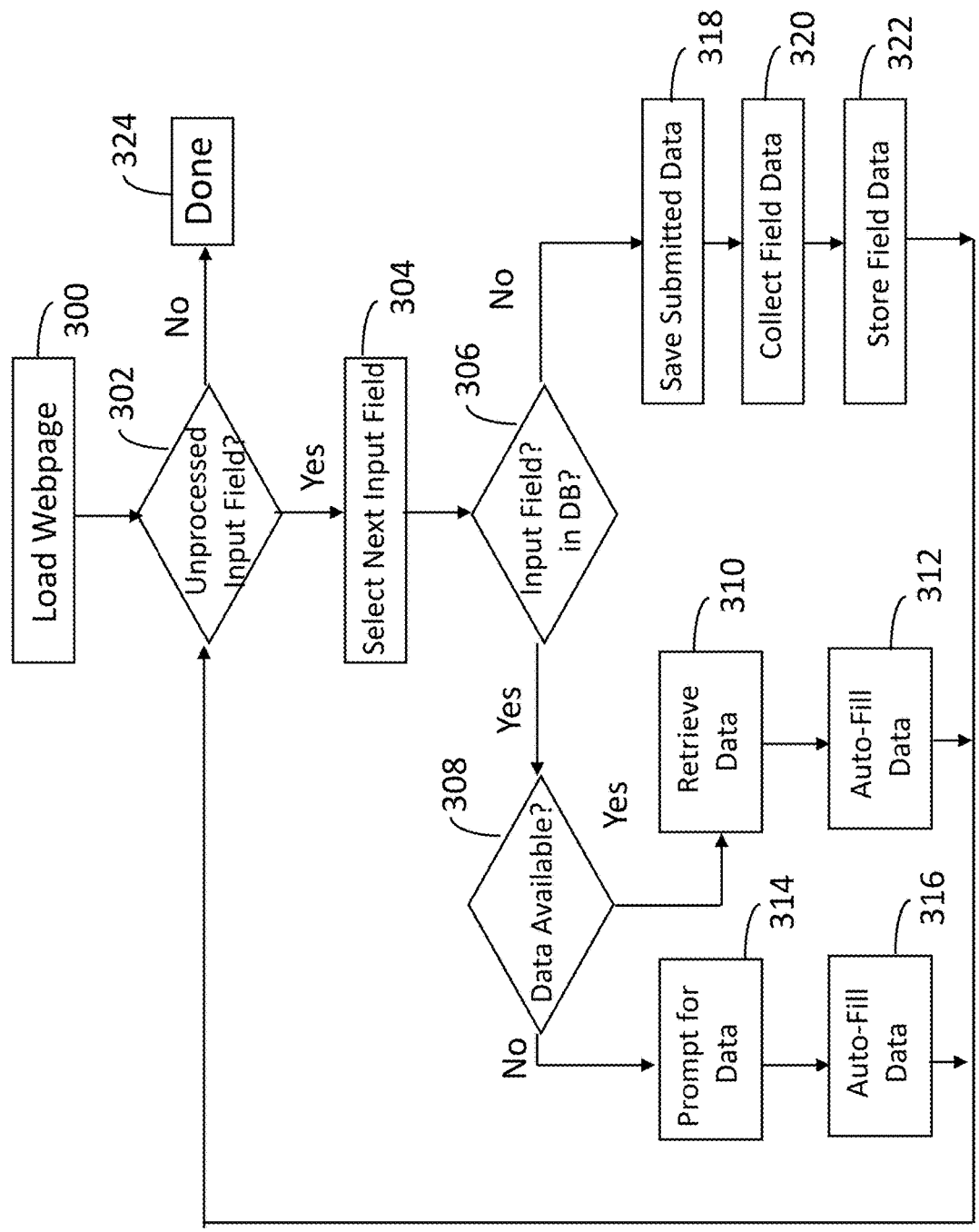
FIG. 3 illustrates auto-fill processing performed in accordance with an embodiment of the invention.

FIG. 3 illustrates processing associated with an embodiment of the user data monitor 202. A webpage is loaded 300. It is determined whether there is an unprocessed input field 302. If so (302—Yes) the next input field is selected 304. It is then determined whether the input field is in the user data database 306. If so (306—Yes), it is determined if data for the field is available 308. If so (308—Yes), the data is retrieved 310 and the web form is auto-filled with the data 312. If data is not available (308—No), the user is prompted for the data 314 and then the web form is auto-filled with the data 316.

If the input field is not in the database (306—No), the user populates the web form in a normal manner. When the user submits the populated web form, the submitted data is saved 318. The submitted data is evaluated to collect field data 320 and to store corresponding field data 322. The processor of blocks 302-322 is repeated until there are no unprocessed fields (302—No), at which point processing is done 324.

User data entries may also contain an action type. The action type denotes user actions that can be performed on a webpage and include things such as: button clicks, screen taps, scrolling, mouse dragging, etc. While action types may be performed independently, they are usually performed after all possible user data elements have been copied into a webpage's form and the action then used to submit the form data.

In one embodiment of this invention, a plug-in or add-on module can be added to a web browser to help users manage the data they enter into input forms on webpages. This add-on module can also enable users to switch between their digital identities (i.e., which digital identity is active or dominant) in order to compartmentalize which set of user data is used to auto-fill or automate activities on webpages.

This module also determines whether a given web page has been visited previously, detects webpage element fields, correlates webpage elements with user data, auto-fills correlated data items, and performs user interaction functions as needed. This plug-in handles communications with the user data management system 204 which may be located on the local device, on a secure internet site, or split between the two. In addition to a web browser plugin, an Application Program Interface (API) may be provided in order to enable these functionalities in other applications.

The user data management system 204 provides the ability to store, retrieve, use, and manage user data, webpage URLs, and webpage element names. One of the types that can be stored is a reference to a webpage's action functions. Mapping a webpage's action functions gathers the information necessary to invoke them upon demand or, in other words, automate them. One method of mapping is to record how a user invokes them the first time a site is visited. Another method of mapping is to share navigational results with other users, in a non-personally identifiable manner, so that other users may use the on-ramp services upon their first visit to a new site.

In cases where all of a webpage's elements have been correlated with user data and their action functions identified, it enables a host application to programmatically navigate to a webpage, insert the corresponding user data into the webpage's element fields, and then invoke the action functions.

This capability enables a user to direct their application to perform numerous activities on their behalf and without the user needing to either type the requested information or press any 'submit' buttons to submit a form. This is a powerful capability that users can employ to automate many form-based operations, such as: account creation, account login, account deletion, shopping purchase activities, eBook checkout, etc. This capability is referred to as an "on-ramp" and can be used by both by incidental and continual use cases.

While much of this disclosure demonstrates how on-ramps may be generated by individual users or automated processes, it is also disclosed that compatible and continually up to date on-ramps templates may be created and published by individual website owners in order to establish compatibility with the on-ramp services. This could be accomplished by the automated processes described herein or website owners could create the on-ramps by editing the on-ramp storage format representation (e.g., XML, JSON, etc.) manually or via the corresponding on-ramp services API.

The HTML form submission processes described above is one of many examples of how a website interacts with a user to enable them to input requested information. While a simple login process is provided as an example, soliciting information from a user may take on many forms ranging from a simple input form to more complex data entry sequences that could span multiple pages.

Regardless of the complexity, a map of user interaction steps known as an on-ramp template (ORT) can be created to model the user interaction processes that websites require. ORTs contain a series of data and process modeling specifications, such as the following: the methods of collecting information from a user, the host website, the information types requested, the implementing technologies, the structure of the request, submission processes, any relevant rules or heuristics, etc. Some on-ramp templates may be rigidly-defined to have precise input fields, formatting, and processes. Alternatively, other on-ramp templates may have fuzzy descriptions with a set of defining heuristics that may represent a range of closely-related, but differing, characteristics.

Defining on-ramp templates, in a general manner, is best done using a template and/or structured grammar that can be populated with many different elements so as to define the elements and whether they are optional, required, or prohibited for a particular on-ramp template. Below is one example of the type of content an on-ramp template might contain.

| On-Ramp Template (Example Definition) | |
| --- | --- |
| Name: | Descriptive name |
| Usage Type: | One of: Login, Commerce, Search, etc. |
| Technology Type: | One or more of: HTML, PHP, JavaScript, etc. |
| URL Protocol Type: | https or http |
| Rules & Heuristics | |
| Spans forms/pages | Integer |
| Fields (one or more): | |
| Field | |
| Mandatory | True or False |
| Element | Input |
| Type | One of: Input or Submit |
| Attribute | One of: values by element type (e.g., text) |
| Value | Alias of defined value types |
| Position | Coordinates or relative position |
| Text prompts | |
| Text | Alias of (text) |
| Position | Coordinates or relative position specification |

Using the basic template outlined above, the following shows an example on-ramp template for a very simple HTML-based login form.

| On-Ramp Template Completed (Example Login Form Process) | |
| --- | --- |
| Name: | Login Automation |
| Usage Type: | Login |
| Technology Type: | HTML |
| URL Protocol Type: | https://login.example.com |
| Rules & Heuristics | |
| Spans forms/pages | 1 |
| Input Fields | |
| Input Field #1: | |
| Mandatory: | True |
| Element: | Input |
| Attribute: | Text |
| Value: | Alias of "user name" |
| Position: | [Not Specified] |
| Input Field #2: | |
| Mandatory: | True |
| Element: | Input |
| Attribute: | password |
| Value: | Alias of password |
| Position: | [Not Specified] |
| Submit Fields | |
| Submit Field #1: | |
| Mandatory: | True |
| Element: | Input |
| Type: | Submit |
| Value: | Alias of "login" |
| Position: | [Not Specified] |

| On-Ramp Template Completed (Example Login Form Process) | |
| --- | --- |
| Submit Field #2: | |
| Mandatory: | False |
| Element: | Input |
| Type: | Submit |
| Value: | Alias of "cancel" |
| Position: | [Not Specified] |

The text comprising the on-ramp template is denoted here using plain text. This is for simplicity in describing the method. In practice, the data representation and on-ramp template could be implemented with one of many standardized data representation formats, such as: XML, JSON, etc.

The phrase "Alias of . . . " is used when describing non-deterministic relationships between data items. For example, while HTML (for example) is very well-defined syntactically, it leaves the naming of screen objects to the discretion of the programmer of the web page. Given the individual discretion and preferences of web page programmers, any field could take on any number of possible names. However, the name variations are usually similarly descriptive in purpose and a User Data element name like 'user-name' could equate to webpage element names with similar meaning, such as: user_name, Username, login_name, login, user, etc. This makes correlating webpage element names with their user data counterparts into a fuzzy or non-deterministic relationship. As a result, a fuzzy correlation function serves to associate like elements with different webpage element names, which is described in connection with the user data management system.

Prior to using an on-ramp to automate interactions with a remote website, the website's user interaction mechanisms must be analyzed, coordinated with user data, and then be stored for later use. On-ramps may be created in response to a user identifying a website with on-ramp templates that they would like to model, save, and automate at a later time. In this instance, an on-ramp is automatically created after analyzing the website's user input sequences have been modeled, correlated, and stored in an on-ramp library. Completed (e.g., with access data integrated) on-ramps may be protected and stored along with a user's sensitive data or, alternatively, on-ramp templates may also be cleansed of personal information and shared with other users. This sharing can be person-to-person or it can be performed via a managed on-ramp library where the on-ramp templates are verified and validated prior (by a server-side process or processes) to being made available to other users.

Downloading an on-ramp template from a central location provides a user's application with the opportunity to automatically associate user data with the on-ramp template and then be ready to activate (i.e., launch) upon an overt direction from the user. This allows users to download on-ramp templates that create accounts on any one of a number of websites, automatically populate the necessary user data, and then create a user account on a remote website without any typing, selecting, clicking—other than for the user to launch the on-ramp.

In another embodiment, on-ramp templates may also be defined before identifying the target website(s) in which case, they are stored in an on-ramp library (personal or a managed online site). The process to assign or complete these on-ramp templates could occur in response to a user invoking an assignment process to overtly link them to a site known to match the on-ramp parameters. Alternatively, completing an on-ramp template may also be a part of a web crawling or searching process whereby searching numerous websites and examining their on-ramp templates for any that match or are similar to on-ramps previously established. This process allows a user to seek out new websites that match their existing on-ramp processes and user data. In this process, a single on-ramp may service many websites (e.g., a simple login process can be similar across many websites).

Figure 4:
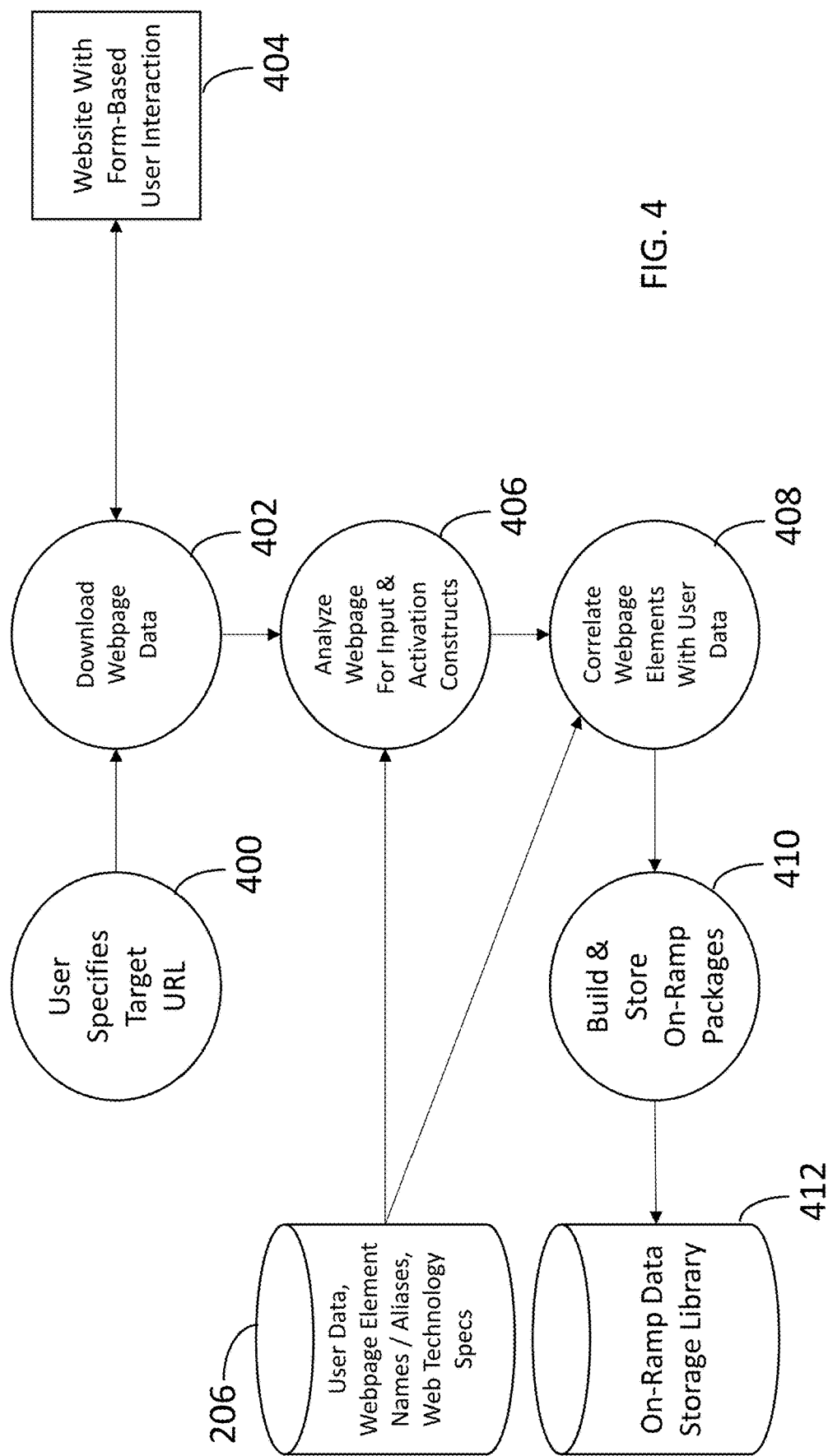
FIG. 4 illustrates on-ramp interactions with a remote web site that are performed in accordance with an embodiment of the invention.

In another embodiment, determining the starting point for analyzing webpages to build on-ramps/templates starts with a user specifying a target URL. This target URL is input into the on-ramp generation process that analyzes the target URL's webpage(s) to look for any user input and action fields. Recognized input fields and activation constructs are correlated to user data, as described previously. The correlated results are packaged into an on-ramp/template container and are stored for later use. This process is characterized in FIG. 4. In particular, FIG. 4 illustrates that a user initially specifies a target URL 400. Webpage data is downloaded 402 from the specified website 404, which has form-based user interactions. The webpage is analyzed for input and activation constructions 406. The user data 206 may be accessed to inform this analysis. Webpage elements are correlated with user data 408, again with periodic access to user data 206. This processing builds and stores on-ramp packages 410, which are collected into an on-ramp data storage library 412.

In another embodiment, an automated 'web crawling' process is used to find correlations for previously unassigned on-ramp templates. Examples of where this is needed include currently defined on-ramp template specifications for performing common activities such as authentication and login operations. Since many authentication and login operations are sufficiently similar across many websites (e.g., using aliases as described previously), existing on-ramps can be tailored to accommodate newly-discovered, yet similar, websites.

Figure 5:
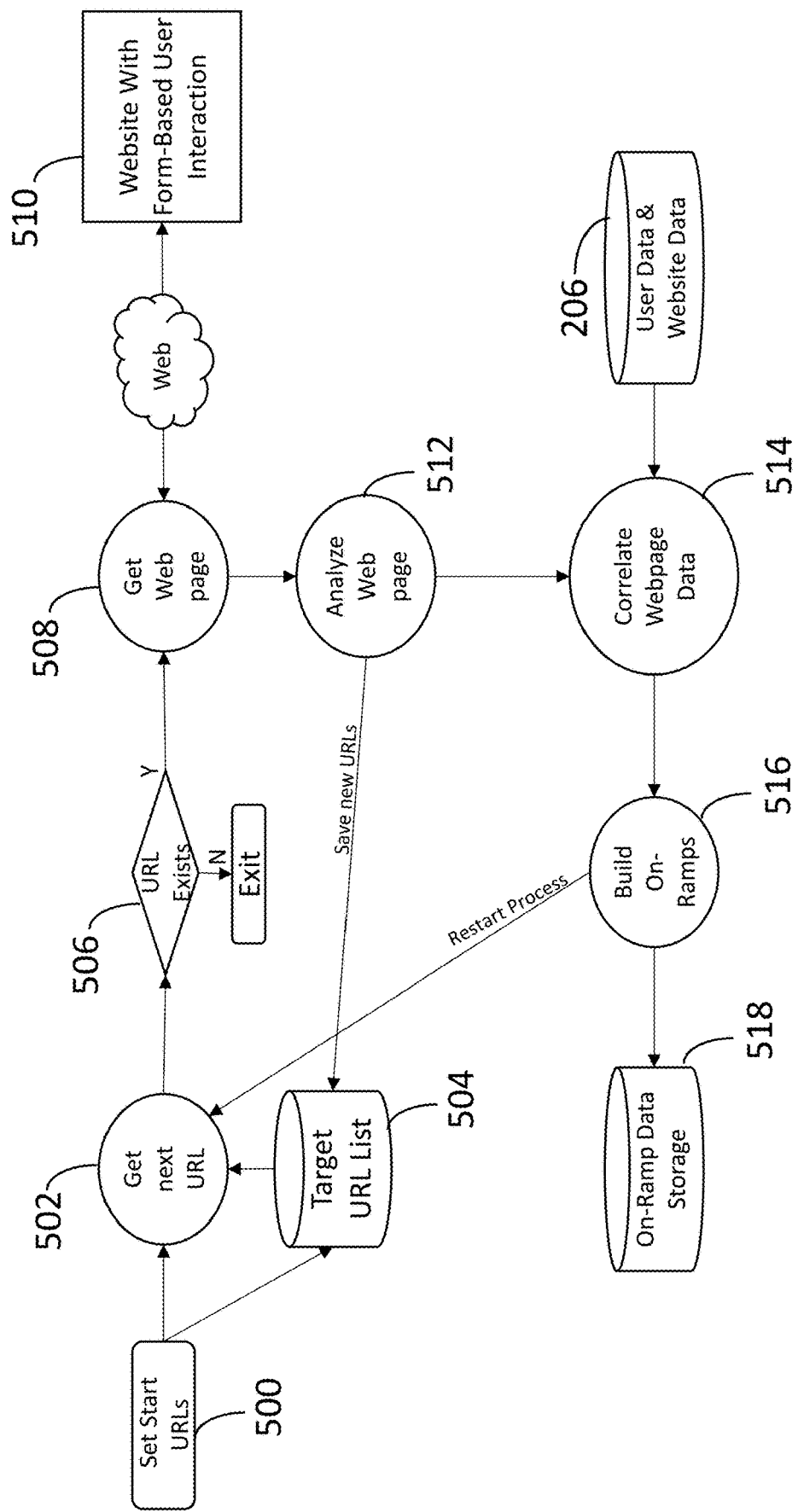
FIG. 5 illustrates web crawling operations performed to discover and build on-ramp templates in accordance with an embodiment of the invention.

Web crawling, in this context, may be used to enable a list of URLs to be sequentially processed to 1) discover additional web pages that match target on-ramps/templates, and 2) identify new URLs that are appended to the list for subsequent web crawling. Websites with form input sequences that match target on-ramp templates are analyzed, correlated with user data, packaged as on-ramps, and are stored for later use. Alternatively, web pages matching the target on-ramp templates may also be discovered by querying external search engines (e.g., Google®, Bing®, Yahoo®, DuckDuckGo®, etc.). This process is characterized in FIG. 5 and repeats as long as there are unprocessed URLs in the target URL List. In particular, FIG. 5 starts 500 a process in which an unprocessed URL is retrieved 502. If the URL is no longer active (506—No), processing for the URL is completed. If the URL is active (506—Yes), the web page is retrieved 508 from the website 510. The webpage is analyzed 512 (e.g., to identify web page elements). Webpage data is correlated 514 with reference to the user data database 206. This results in the construction of on-ramps 516, which are collected in on-ramp data storage 518.

In another embodiment, applying rules-based, heuristics-based, or intelligent analysis to web crawling results is used to refine the web crawling results and better identify more relevant target URLs that are more closely related to a desired topic or process. In this embodiment, contextual webpage information and functional constructs co-located on a target webpage (or surrounding webpages) is used to evaluate whether the webpage should be further analyzed and mapped for creating a target on-ramp/template.

As an example, if an on-ramp/template creating process is searching for "Login Pages", this process starts by searching for input form data. Next, the process analyzes both the input field data, as well as, other textual information on the webpage to search for terms related to the target form process, such as "login", "password", "username", "user", etc. Searching for similar terms (or aliases; see webpage URL/user data/webpage element names (aliases)/data type table above) on the webpage and within the input form helps differentiate between numerous forms of similar construction or correlates forms with sufficiently similar construction.

Similarly, if the on-ramp/template creating process is looking for forms that uploaded data items, such as photos, then identifying input elements that enabled users to select a file and submit the results helps identify potential forms dedicated to that purpose. In another example, if the process is searching for online commerce activities, it can alternatively look for constructs that denoted the input of credit card data (e.g., credit card number, full name, expiration data, Card Verification Value (CVV) code, etc.

On the Internet, information, structure, format, etc. are continuously changing. Changes to websites may occur frequently or they may stay the same for years before changing. The only thing that is certain is that the time of structural changes that can affect existing on-ramps can occur without notice. As a result, on-ramps must undergo a continual validation testing process whereby their structure is validated against the corresponding website and the expected results compared against actual results obtained through testing the on-ramp.

In one embodiment, on-ramps are tested in a crowd-sourced manner whereby users using the on-ramps report them as 'broken' and an automated or manual process validates the reports and creates updated on-ramps. In the event that a website or process embodied in an on-ramp is removed from the Internet, then the on-ramp will similarly be removed or archived.

In another embodiment, an automated process periodically re-evaluates the on-ramps structure by visiting the website's URL and creating a new on-ramp. The new on-ramp and the existing on-ramp are compared to see if any changes exist. Additionally, the on-ramp being tested may be executed to verify whether the predicted or desired outcome occurred as specified. If changes or invalid results are detected, then the new on-ramp replaces the existing on-ramp. If the on-ramp is re-evaluated on a user's local system, then the process is complete. If the on-ramp is re-evaluated by a server process that coordinates on-ramps for multiple users, then the on-ramp updates are communicated (or 'pushed') to any users currently in possession of the affected on-ramp.

In addition to more simple on-ramps, some on-ramps will be more complex. For example, FIG. 6 demonstrates a single webpage 600 that as two separate input form types with one providing a login process 602 and the other providing a sign-up process 604.

When two input forms are discovered on a single page and they represent two separate functional processes, two separate on-ramps/templates are created. Both on-ramps/templates reference the same URL, however, they also perform two separate processes upon navigating to this URL, which is why they warrant a separate on-ramp/template for each process. Quite often when user interaction processes are on the same (or 'nearby') page, it means they are related (e.g., a sign-up process and a login process). In such cases, the on-ramps can be linked, co-located for user convenience, or even conjoined in order to simplify discovery and usage for the user.

Figure 7:
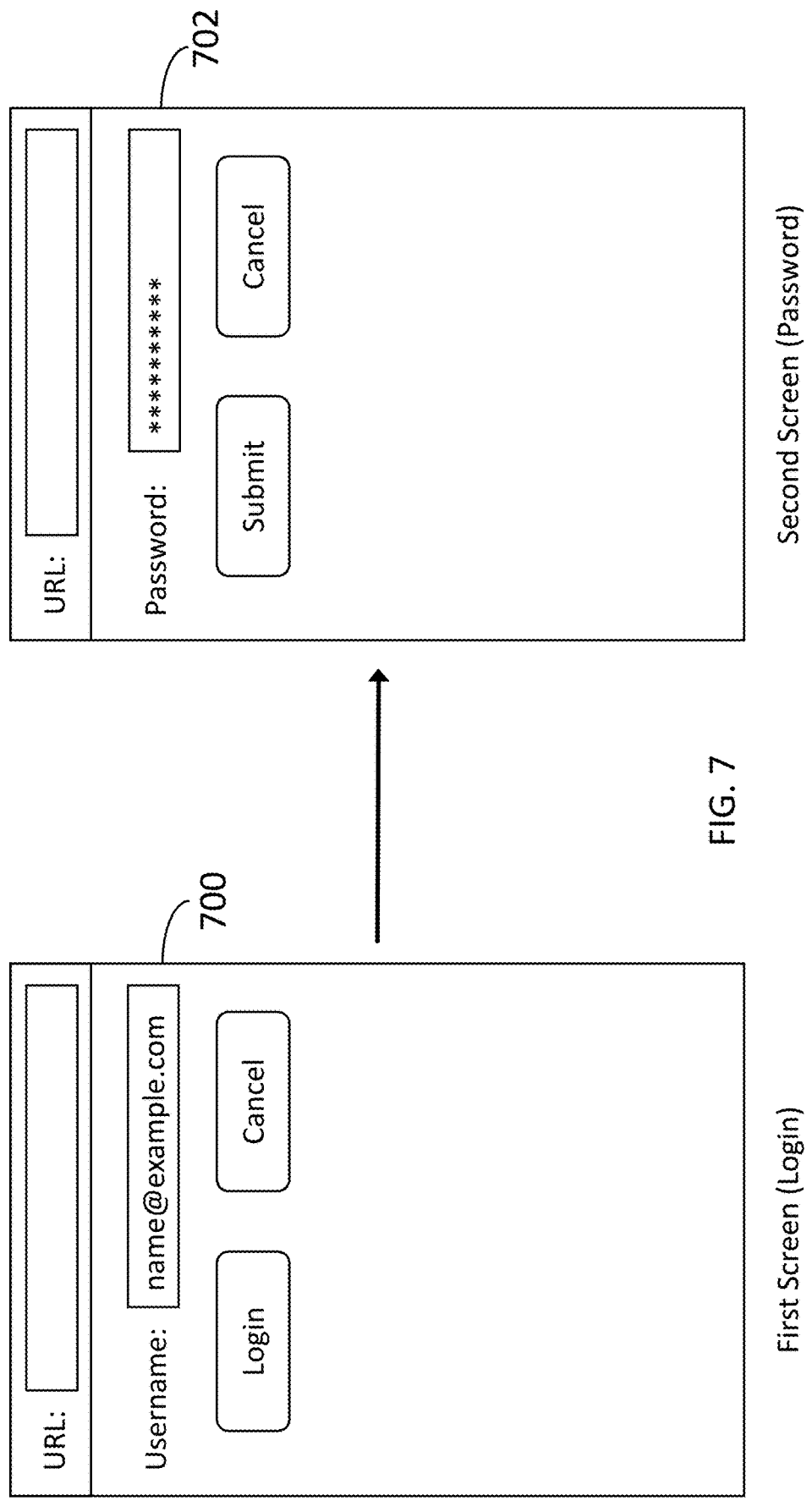
FIG. 7 illustrates on-ramp processing for multiple web pages.

Other times, input forms may be sufficiently complex (or became so by programmer preference) that they warrant spanning multiple pages. This is complicating in that they likely employ multiple separate input forms that are then correlated on the webserver. In this case, multiple partial on-ramps/templates are created (one for each page); they are then joined into a single sequential on-ramp sequence. FIG. 7 depicts a multi-page login process that would result in a complex on-ramp. The multiple separate input forms include a first screen login 700 and a second screen password 702.

Figure 8:
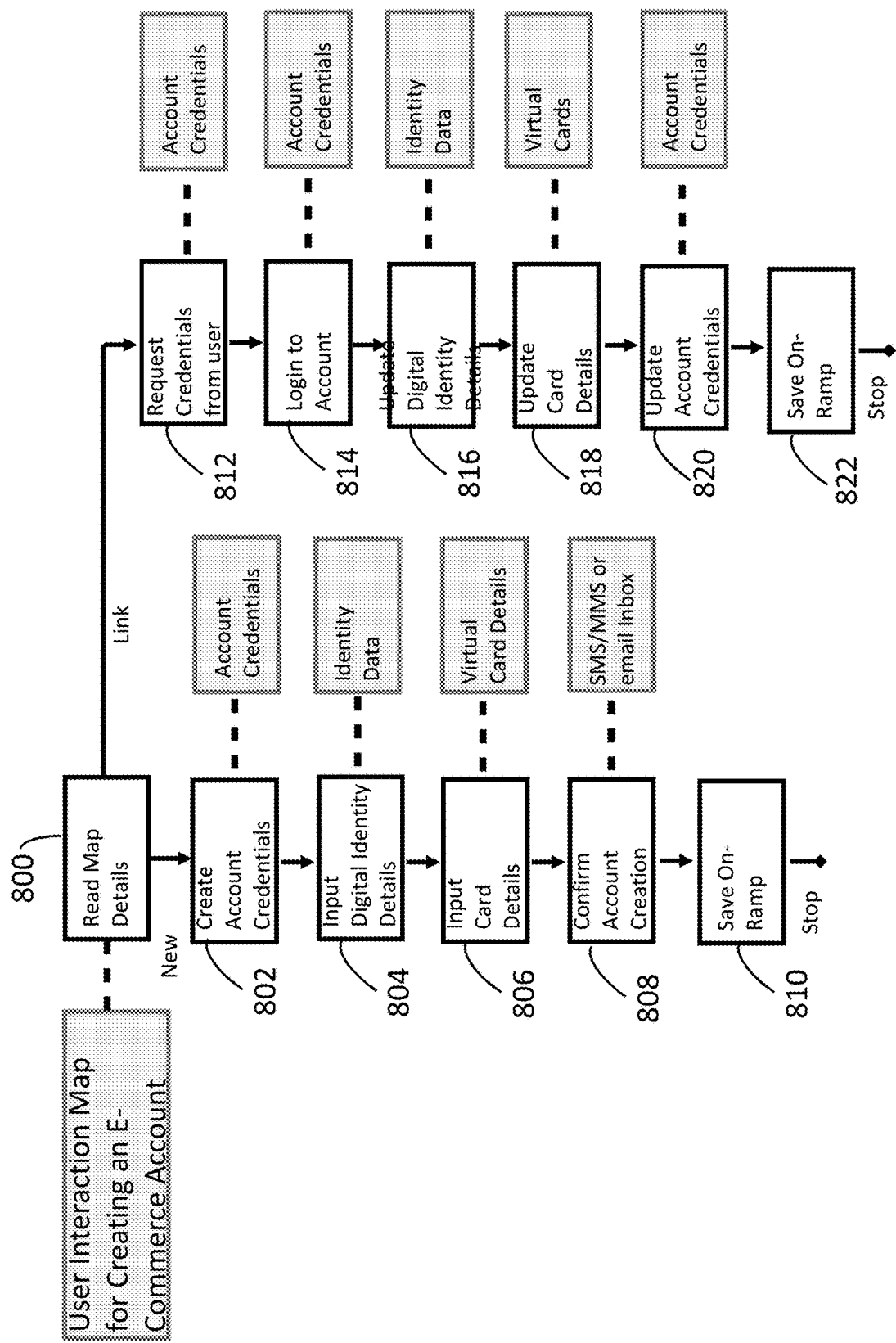
FIG. 8 illustrates on-ramp account creation and linking processes performed in accordance with an embodiment of the invention.

FIG. 8 shows an example on-ramp process flow for creating a new account and linking to an existing account. The steps for creating a generic e-commerce account are depicted in FIG. 8 and are detailed below:

1. The e-commerce on-ramp/template sequence is read 800 from app storage. This is the computer readable set of steps for creating a new account on the e-commerce site.
2. The user is prompted to create account credentials (e.g., username and password) 802, which can be created by the user or automated values can be provided by the system and will be stored in the User Data.
3. The Digital Identity data is read from User Data storage and auto-filled into the webpage's input form 804. This can include data, such as: name, date of birth, email address, phone number, billing and delivery address, etc.
4. The Digital Identity will have (or will create) a virtual credit card that is read from User Data Storage 806. If the user does not yet have a virtual credit card for this Digital Identity, then they may create one (process not shown).
5. The User confirms the account creation 808, usually by responding to an email or message from the e-commerce site.
6. Finally, the On-Ramp is completed, stored, and available to subsequently login to the e-commerce site 810.

The right side of FIG. 8 shows operations for linking the Digital Identity to an existing account of the user:

1. The e-commerce on-ramp/template sequence for the account is read from User Data storage 800. This is a computer readable set of steps (i.e., comprising the on-ramp) for linking to an existing account on the e-commerce site.
2. The user is prompted to enter their existing digital identity account credentials 812 (e.g., username/password) for the e-commerce account. These are stored in the user data storage.
3. The on-ramp executes the login process 814 for the digital identity on the e-commerce site.
4. The on-ramp updates any digital identity details 816 where there is a discrepancy between the digital identity details and what is currently registered on the e-commerce site.
5. The On-Ramp updates any virtual credit card details 818 with the e-commerce site. If the user does not yet have a virtual credit card for this digital identity, then they are invited to request one (process not shown).
6. The user may also update their account credentials (e.g., with a new password) 820. If they choose to do so, this is updated in the user data storage.
7. Finally, any changes to the on-ramp are completed, stored, and available to subsequently login to the e-commerce site 822.

Figure 9:
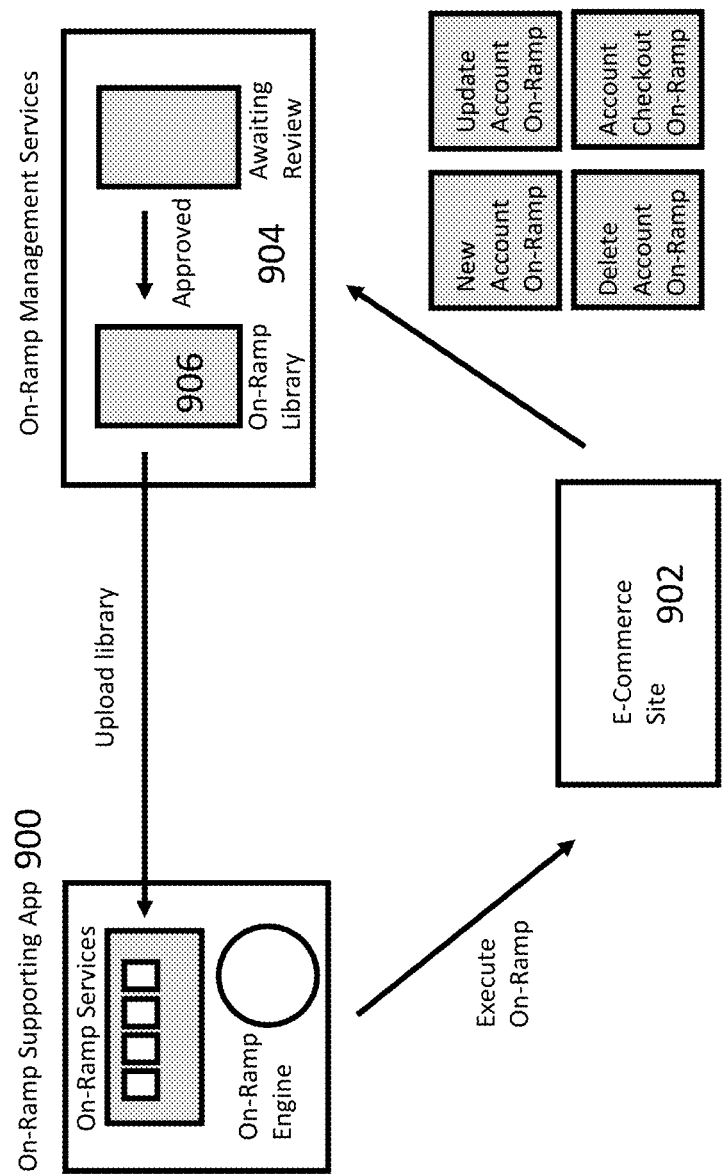
FIG. 9 illustrates an on-ramp life cycle process.

FIG. 9 shows the full lifecycle of an on-ramp. The on-ramp supporting app 900 can either be a web browser or a separate application that implements the on-ramp functional API. This app provides an operation screen for the user's web browser. There is a separate screen for each digital identity, which has the following functions:

1. Enable configuration of the user interface by selecting which on-ramps to display. The digital identity selects from a library of e-commerce sites provided by an online on-ramp library.
2. Allow the digital identity to initiate execution of an on-ramp (e.g., creating a new e-commerce account or linking to an existing e-commerce account)
   a. The on-ramps allow the on-ramp supporting app 900 to automatically execute a sequence of steps on the E-Commerce site. These on-ramps may be provided by the E-Commerce site, by a trusted third party organization, a digital identity application development team, or even created by the user's on-ramp supporting app. The on-ramps can be personally-validated or submitted to the on-ramp management services for review and signing. (In the figure the e-commerce site 902 is submitting the on-ramps to on-ramp management services 904.)
   b. On-Ramp Management Services 904 receive the ramps. These ramps are reviewed. In one embodiment, the review includes the following steps:
      i. Comparing the on-ramp against a known on-ramp template (e.g., XML or JSON schema to see that it is structured correctly)
      ii. Having a user or computer step through each On-Ramp to make sure they are working as expected. It is important that the ramps are checked for any information security flaws (e.g., data sent to a site not associated with the on-ramp)

After the review is complete, the on-ramps are placed in the on-ramp library 906 for access by the on-ramp supporting applications 900. The on-ramps need to be versioned (and tagged with a version number) so that supporting applications can determine when a new on-ramp version is available.

Figure 10:
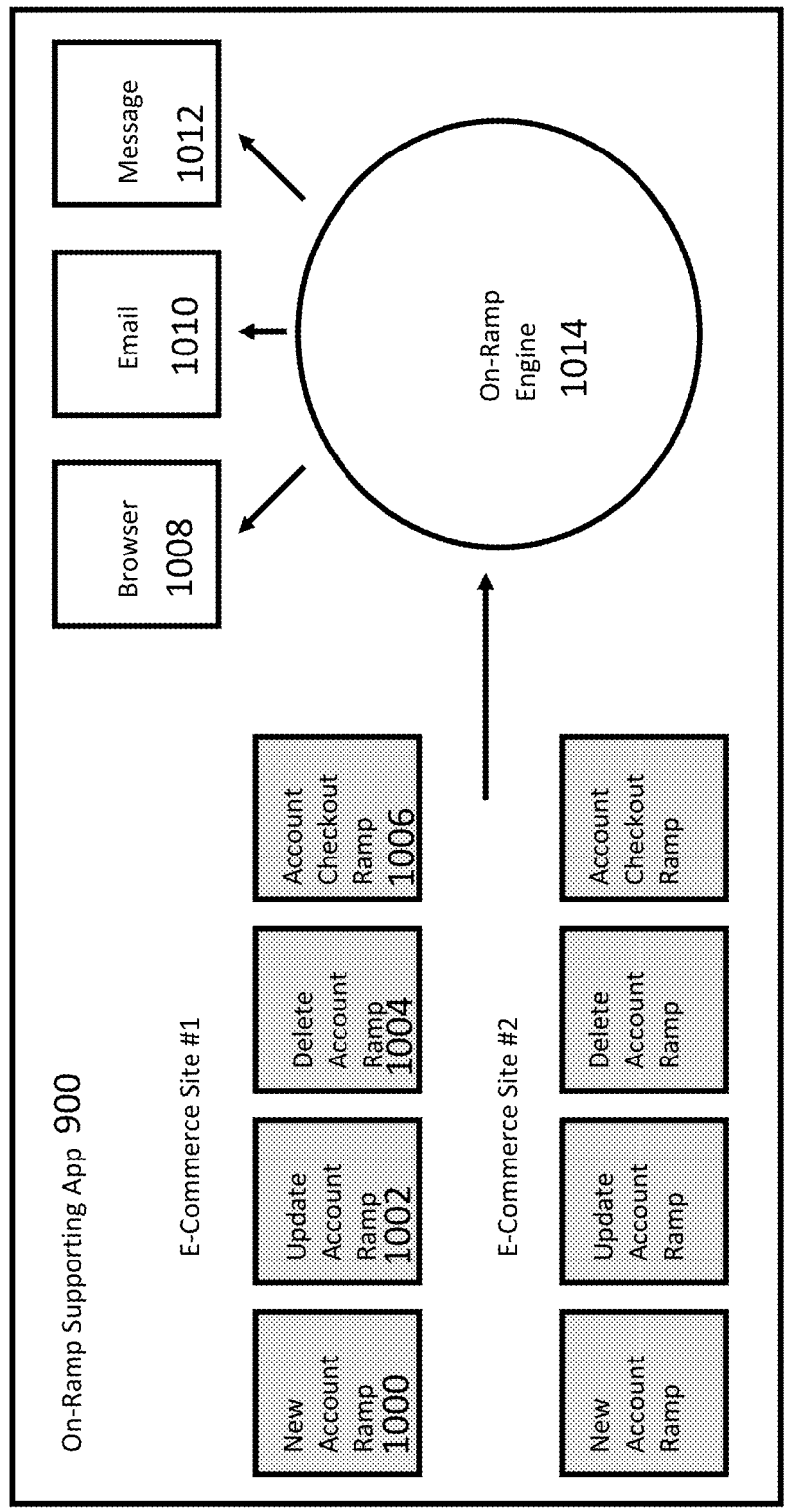
FIG. 10 illustrates on-ramp processing performed in accordance with an embodiment of the invention.

FIG. 10 shows more detail around on-ramp execution. For each e-commerce site, account on-ramps are defined that specify how to add a new account 1000, update an account 1002, delete an account 1004, and conduct a shopping checkout process 1006. The on-ramps define a process flow that directs the browser 1008, email component 1010 and message component 1012 of (or connected to) the on-ramp supporting application, as coordinated by the on-ramp engine 1014. These on-ramps can be created in JSON, XML or a similar structured language that provides a definition for a sequence of steps.

Figure 11:
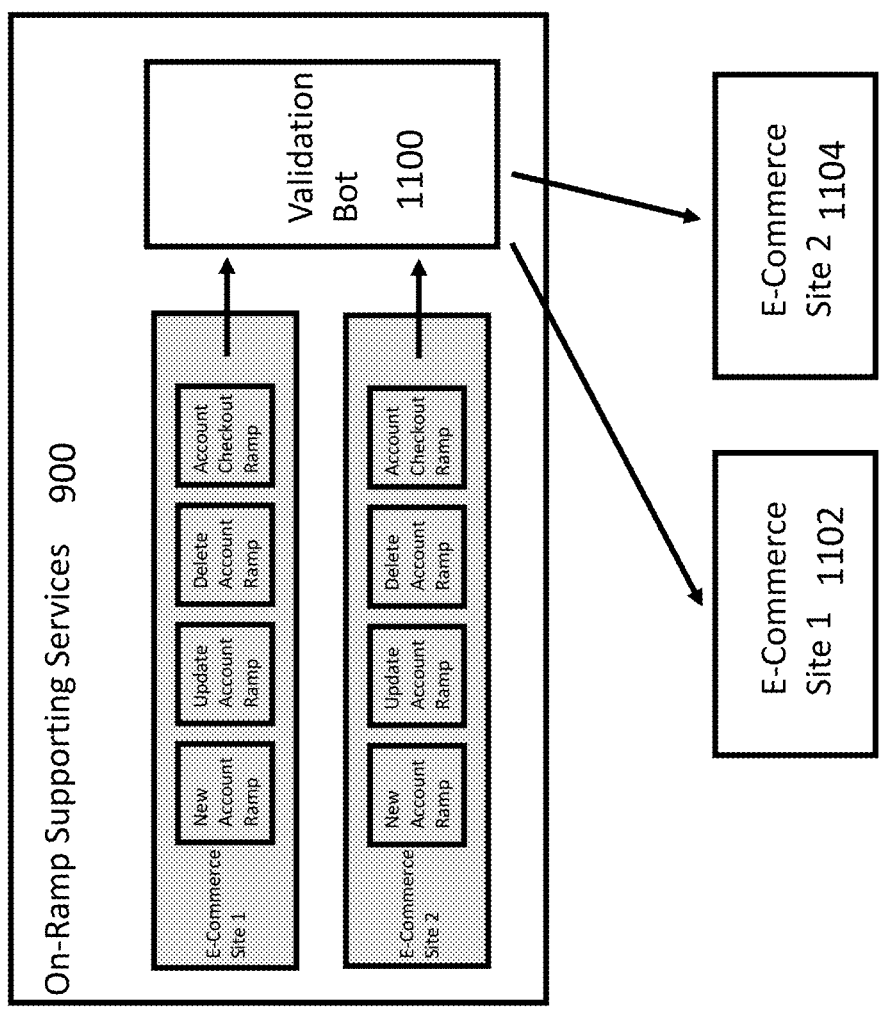
FIG. 11 illustrates on-ramp re-validation performed in accordance with an embodiment of the invention.

One of the potential difficulties for an on-ramp is that the target site can be changed, which renders the on-ramp out of sync with the site. FIG. 11 illustrates an approach to identify when ramps are no longer synchronized. An automated bot 1100 within the on-ramp supporting app 900 periodically communicates with different sites 1102, 1104. If an on-ramp is no longer synchronized, it is marked as such in the on-ramp library and all on-ramp supporting applications are notified.

Figure 12:
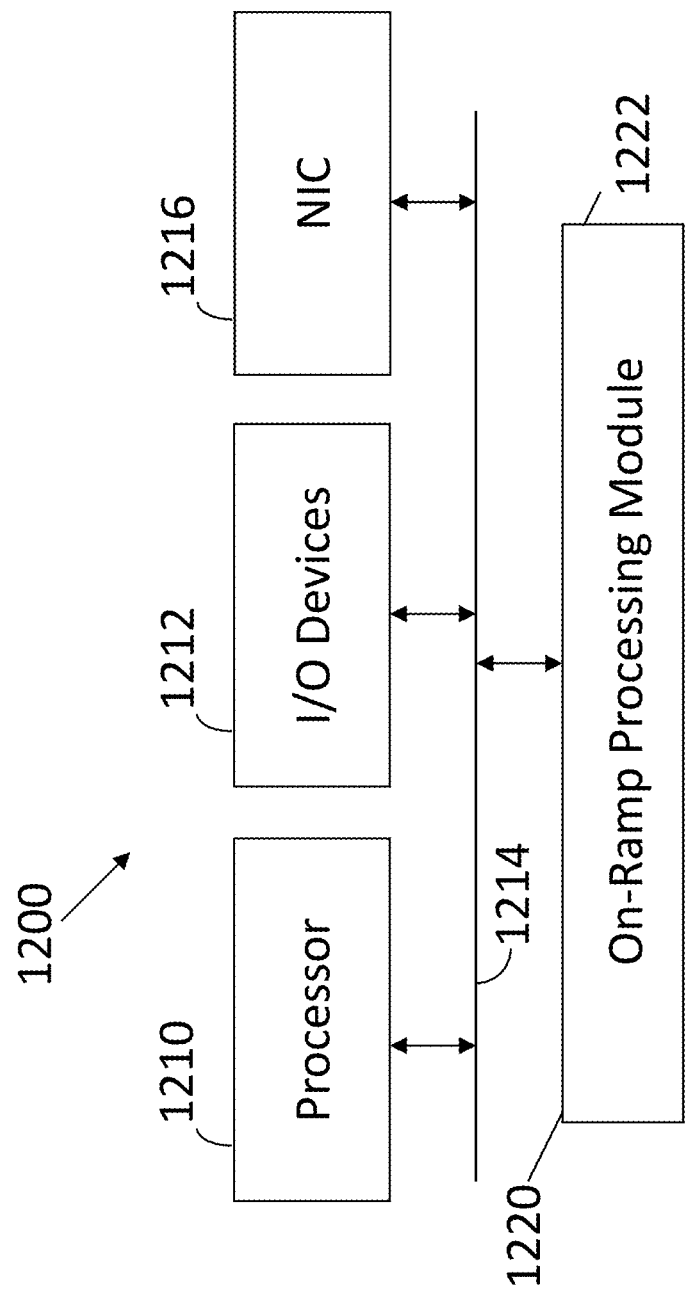
FIG. 12 illustrates a machine configured to perform operations disclosed herein.

FIG. 12 illustrates a machine 1200 configured in accordance with an embodiment of the invention. The machine 1200 includes a processor 1210 connected to a set of input/output devices 1212 via a bus 1214. The input/output devices 1212 may include a keyboard, mouse, touch display and the like. The machine also includes a network interface circuit 1216 connected to the bus 1214 to provide connectivity to a network, which may be any combination of wired and wireless networks. A memory 1220 is also connected to the bus 1214. The memory 1220 stores an on-ramp processing module 1222 with instructions executed by the processor 1210 to implement operations disclosed herein. Machine 1200 may be a server or set of servers to implement the disclosed operations.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
   a processor; and
   a memory connected to the processor, the memory storing instructions executed by the processor to:
      store identity attributes including real identity attributes for a real individual and internet usage role digital identities to separate internet activities of the real individual, each internet usage role digital identity having digital identity data attributes operative as a personal privacy proxy for the real individual,
      automatically fill website input forms alternately using the real identity attributes and the internet usage role digital identities, wherein the instructions to automatically fill website input forms enables the real individual to switch between the real identity attributes and the internet usage role digital identities to compartmentalize data associated with the real individual;
      repeatedly load different website pages from different websites;
      match input fields of the website pages to information in a user data database to establish an on-ramp package to automatically fill website input forms and thereby form a collection of different on-ramp packages for the different websites; and
      seek within the collection of different on-ramp packages for the different websites new websites that match existing on-ramp processes and user data.

2. The apparatus of claim 1 further comprising instructions executed by the processor to:
   load a new website page;
   select an unprocessed input field in the new website page;
   compare the unprocessed input field to information in a user data database to alternately identify a match and a mismatch;
   retrieve data from the user data database in the event of a match; and
   save submitted data, collect field data in the submitted data, and store the field data in the event of a mismatch.

3. The apparatus of claim 2 further comprising instructions executed by the processor to prompt a user for input field data in the event of a mismatch.

4. The apparatus of claim 1 wherein the user data database includes a table with columns specifying a website address, a website user data element, a website element alias and a data type.

5. The apparatus of claim 1 wherein the on-ramp package includes instructions executed by the processor to automatically fill new account website input forms.

6. The apparatus of claim 1 wherein the on-ramp package includes instructions executed by the processor to automatically fill update account website input forms.

7. The apparatus of claim 1 wherein the on-ramp package includes instructions executed by the processor to automatically fill delete account website input forms.

8. The apparatus of claim 1 wherein the on-ramp package includes instructions executed by the processor to automatically fill account checkout website input forms to facilitate a purchase.

9. The apparatus of claim 1 further comprising instructions executed by the processor to divide the website page into a first website page segment that implements a first function and a second website page segment that implements a second function.

10. The apparatus of claim 1 further comprising instructions executed by the processor to correlate and associate first input data on a first website page with second input data on a second website page to create an on-ramp package.

11. The apparatus of claim 1 further comprising instructions executed by the processor to transmit unrequested additional input data to the website.

12. The apparatus of claim 11 further comprising instructions executed by the processor to execute a communication protocol to detect and interpret the unrequested additional input data.

13. The apparatus of claim 1 further comprising instructions executed by the processor to assign a reputation score to the digital identity.

14. The apparatus of claim 13 further comprising instructions executed by the processor to transmit the reputation score to a web site hosting the website input forms.

* * * * *